(12) United States Patent
Hämäläinen et al.

(10) Patent No.: US 9,956,754 B2
(45) Date of Patent: May 1, 2018

(54) METHOD AND APPARATUS FOR PROCESSING DISPLAY LAMINATE

(71) Applicant: MariElla Labels OY, Vantaa (FI)

(72) Inventors: Esa Hämäläinen, Nokia (FI); Tero Kallioinen, Tampere (FI); Jouko Parppei, Tampere (FI)

(73) Assignee: MARIELLA LABELS OY, Vantaa (FI)

( * ) Notice: Subject to any disclaimer, the term of this patent is extended or adjusted under 35 U.S.C. 154(b) by 0 days. days.

(21) Appl. No.: 15/152,196

(22) Filed: May 11, 2016

(65) Prior Publication Data

US 2016/0257108 A1    Sep. 8, 2016

Related U.S. Application Data

(62) Division of application No. 13/521,690, filed as application No. PCT/FI2011/050011 on Jan. 11, 2011, now Pat. No. 9,405,166.

(30) Foreign Application Priority Data

Jan. 20, 2010   (FI) ..................................... 20105047

(51) Int. Cl.
  *B32B 38/10*   (2006.01)
  *G02F 1/167*   (2006.01)
  (Continued)

(52) U.S. Cl.
  CPC ............... *B32B 38/10* (2013.01); *B32B 3/02* (2013.01); *B32B 38/0004* (2013.01);
  (Continued)

(58) Field of Classification Search
  CPC . B32B 38/10; B32B 43/006; Y10T 156/1126; Y10T 156/1174;
  (Continued)

(56) References Cited

U.S. PATENT DOCUMENTS

| 4,699,680 A | 10/1987 | Shiraishi et al. |
| 7,868,778 B2 | 1/2011 | Kenwright |

(Continued)

FOREIGN PATENT DOCUMENTS

| JP | 2003-345260 A | 12/2003 |
| JP | 2004-86192 A | 3/2004 |

OTHER PUBLICATIONS

European Search Report, dated Feb. 28, 2017, in EP 16 20 0652.

*Primary Examiner* — Philip Tucker
*Assistant Examiner* — Nickolas Harm
(74) *Attorney, Agent, or Firm* — Birch, Stewart, Kolasch & Birch, LLP

(57) ABSTRACT

An apparatus for processing display laminate, wherein the display laminate includes a front electrode layer, a display material layer and a protective film layer. The display laminate is continuous. A section of protective film layer is continuously removed from the edge of the display laminate by a cutting unit while the display laminate is running through the cutting unit. After removing the section of the protective film layer, a section of the display material layer located at the same edge as the removed section of the protecting film layer is continuously removed by spraying medium in a spraying unit while the display laminate is running through the spraying unit.

9 Claims, 5 Drawing Sheets

(51) Int. Cl.
  *B32B 3/02*    (2006.01)
  *B32B 38/00*   (2006.01)
  *B32B 43/00*   (2006.01)

(52) U.S. Cl.
  CPC ............ *G02F 1/167* (2013.01); *B32B 43/006* (2013.01); *B32B 2457/20* (2013.01); *Y10T 156/11* (2015.01); *Y10T 156/1126* (2015.01); *Y10T 156/1174* (2015.01); *Y10T 156/1184* (2015.01); *Y10T 156/19* (2015.01); *Y10T 156/195* (2015.01); *Y10T 156/1933* (2015.01); *Y10T 156/1956* (2015.01); *Y10T 156/1967* (2015.01); *Y10T 428/24752* (2015.01); *Y10T 428/24777* (2015.01)

(58) Field of Classification Search
  CPC ......... Y10T 156/1184; Y10T 156/1933; Y10T 156/195; Y10T 156/1956; Y10T 156/1967
  USPC ....... 156/706, 715, 717, 756, 759, 760, 762, 156/924
  See application file for complete search history.

(56) References Cited

U.S. PATENT DOCUMENTS

| | | |
|---|---|---|
| 2004/0045830 A1 | 3/2004 | Tseng et al. |
| 2007/0091062 A1 | 4/2007 | French et al. |
| 2007/0182891 A1 | 8/2007 | Toyoda |
| 2008/0054879 A1 | 3/2008 | LeCain et al. |
| 2008/0149271 A1 | 6/2008 | Qi et al. |
| 2009/0000729 A1 | 1/2009 | Danner et al. |

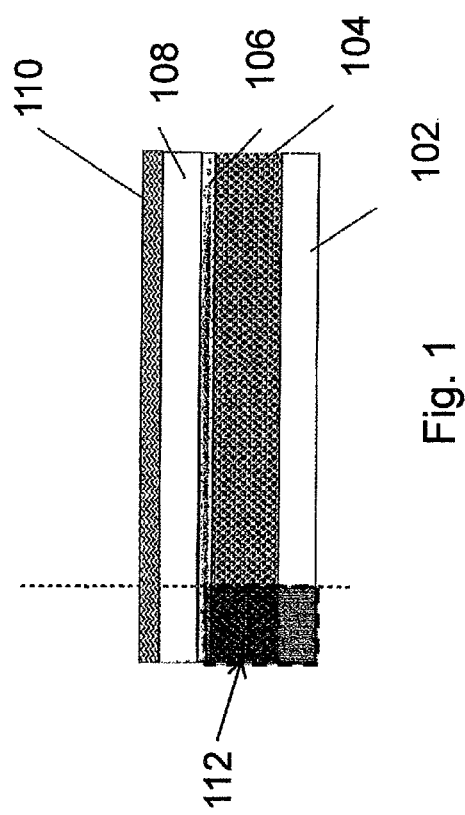
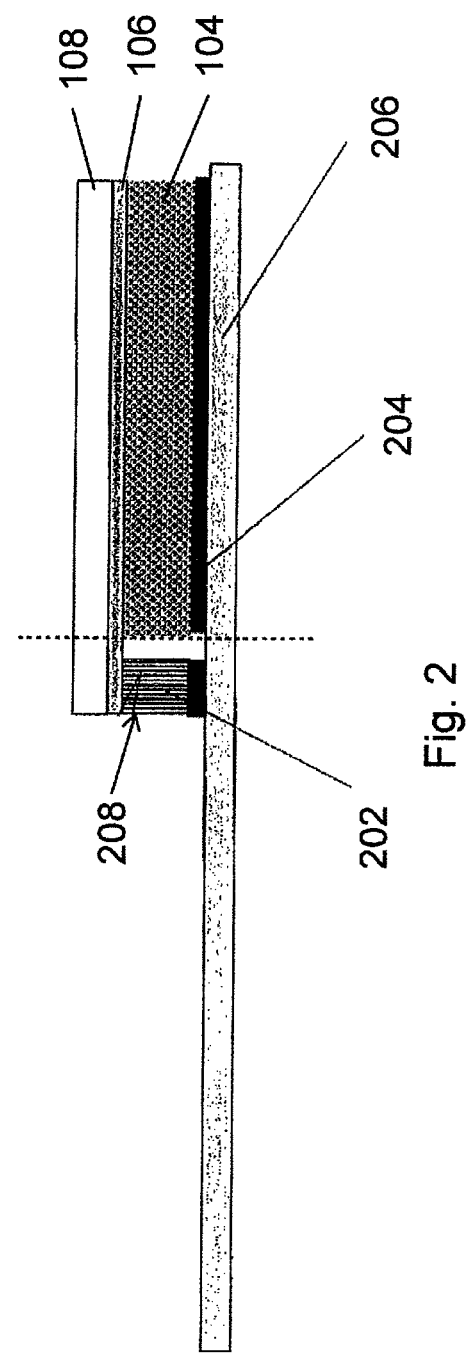

METHOD AND APPARATUS FOR PROCESSING DISPLAY LAMINATE

CROSS-REFERENCE TO RELATED APPLICATIONS

This is a Divisional Application of copending application Ser. No. 13/521,690 filed on Jul. 11, 2012, which was the National Phase of PCT International Application No. PCT/FI2011/050011 filed on Jan. 11, 2011 and claims priority under U.S.C. § 119(a) to Application No. 20105047, filed in Finland on Jan. 20, 2010, all of which are hereby expressly incorporated by reference into the present application.

FIELD OF THE INVENTION

The present invention relates to a method of processing display laminate and to an apparatus for processing display laminate.

BACKGROUND

In manufacturing the electronic displays many process steps are required to create a functional display. For example display laminate provided by the display element manufacturers requires certain processing before it can be used as a functional display.

When the display laminate is converted into a functional display, an electrical contact from driving electronics and backplane to front electrode layer must be established. To achieve this, sections of display laminate need to be removed. In the prior art solutions this is done by manually cleaning a small region of the display film by soft cloth dipped into solvent. This is, of course, a time consuming and tedious job when displays are manufactured in high quantities.

One form of electronic displays are electronic paper displays which are used for example in electronic price tags and e-books. Electronic paper display can be based on electrophoretic display which consists of supporting film, front electrode layer and display material layer. The display material layer can be for example electrophoretic ink layer. In case of electronic labels based on electrophoretic display laminate, electrophorectic ink is removed from a certain area of the display material in order to create room for electrical contact to the front electrode. The front electrode is typically made of evaporated and very thin ITO (Indium-tin-oxide) so the applied removing method must be gentle enough not to damage the electrode.

SUMMARY OF THE INVENTION

The object of the present invention is to remove the disadvantages of the prior art methods by presenting a method and an apparatus to process display laminate by removing a section of display material without damaging the front electrode structure.

In the method of the present invention a section of the protective film layer is cut from the display laminate in order to be able to remove a section of the display material layer. The section of display material layer is removed by spraying medium to the section to be removed.

The presented method can be used for continuous display laminate in a roll-to-roll type process.

After processing the display laminate according to the present invention, the continuous display laminate has room for building an electrical contact from driving electronics and backplane to front electrode.

The processed continuous laminate can form a web of display elements. The web of display elements comprises repetitive patterns which comprise successive and/or sequential individual display elements, which can be cut off from the web after processing the display laminate.

With present invention's method and apparatus it's possible to achieve much higher throughput than with the solutions known from prior art. When compared to the manual process known from the prior art, with the method and apparatus of the present invention much higher quality of the processed products can also be achieved. In addition to that, the prior art doesn't teach any method that could be used for continuous display laminate or roll-to-roll process.

The apparatus and method of the present invention also handles removing of the protective film from the area to be cleaned in the same process.

BRIEF DESCRIPTION OF THE DRAWINGS

FIG. 1 presents an example embodiment of a structure of the display laminate.

FIG. 2 presents an example embodiment of a processed display laminate when it's attached to a backplane electrode.

DETAILED DESCRIPTION

Figure 3:
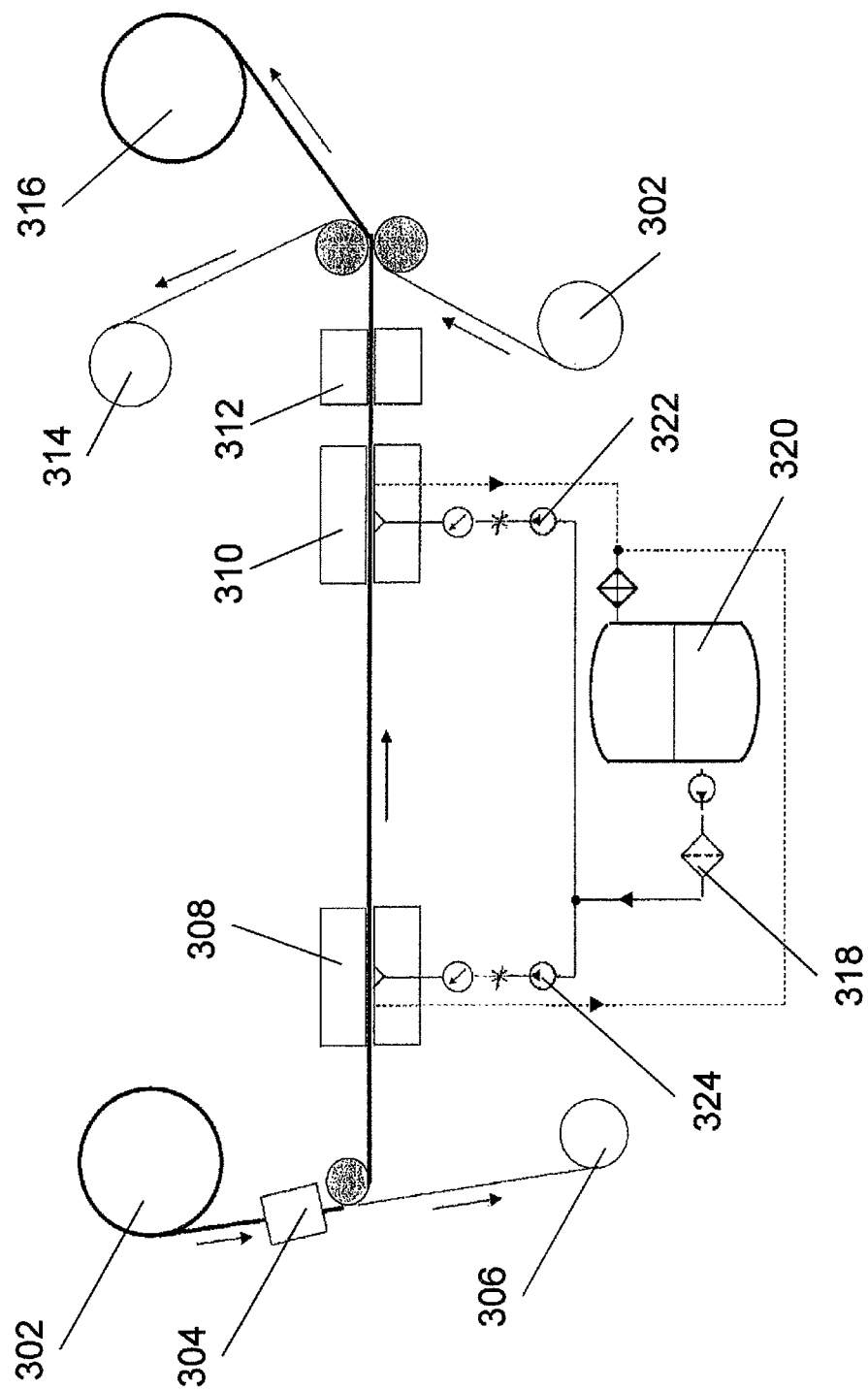
FIG. 3 presents an example embodiment of the apparatus of the present invention.

An example embodiment of display laminate used in the solution of the present invention is presented in FIG. 1. The display laminate of FIG. 1 is preferably substantially flexible. On the bottom of the display laminate is a protective film layer 102. The protective film layer 102 may consist of any flexible material, for example paper, board, or plastic, such as PET, PP, or PE. The protective layer may be in the form of a nonwoven, a fabric, or a foil. Display material layer 104 is placed between the protective film layer 102 and front electrode layer 106. The display material layer 104 can be made for example from electrophoretic ink. Front electrode layer 106 can be made of evaporated and thin ITO (indium-tin-oxide), PEDOT (poly-(3,4-ethylenedioxythiophene)), or carbon nanotubes. On top of the front electrode layer 106 it's possible to have a support layer 108 which protects the front electrode layer 106. The support layer 108 can be made of transparent material, for example clear polymer. A removable masking film layer 110 can be installed on top of the support layer 108 to protect the support layer during manufacturing and transporting. The masking film layer 110 can be removed before taking the product in to use or during processing of the display laminate.

To process the display laminate into a functional display, an electrical contact from driving electronics and backplane to front electrode layer must be established. For creating room for the electrical contact, first a section of the protecting film layer 102 and a section of the display material layer 104 needs to be removed. The area 112 that needs to be removed is presented in FIG. 1. Later in the process electrically conducting material can be installed to area 112.

FIG. 2 presents an example embodiment of a processed display laminate when it's attached to a backplane electrode layer 204 and when the electrical contact is established between front electrode layer 106 and back electrode layer 204. The electrical contact is established by installing an electrically conductive adhesive 202 to the area 208 where the display material was removed. The electrically conductive adhesive 202 forms a contact between the front electrode layer and back electrode layer 204 which makes the display element functional. The processed display element with backplane electrode can be attached to a display substrate 206.

FIG. 3 presents an example embodiment of the display laminate processing apparatus according to the present invention. The apparatus comprises a cutting unit 304, a wetting unit 308, a spraying unit 310 and a drying unit 312. The medium used in the apparatus is pumped from high pressure pumps 324 and 322. Heat exchanger 320 can be used to heat or cool the medium used in the apparatus and filter 318 is used to filter the medium.

Display laminate can be stored as a roll. The apparatus according to present invention makes it possible to use a continuous roll-to-roll process in processing the display laminate. Therefore the apparatus also has rolls 302, 306, 314, 302 and 316 to facilitate the roll-to-roll-process.

Removing a section of display laminate begins by unwinding the display laminate roll 302 and feeding it to the cutting unit 304. In the cutting unit 304, a section of the protective film layer 102 covering the display material layer 104 is removed.

Figure 4:
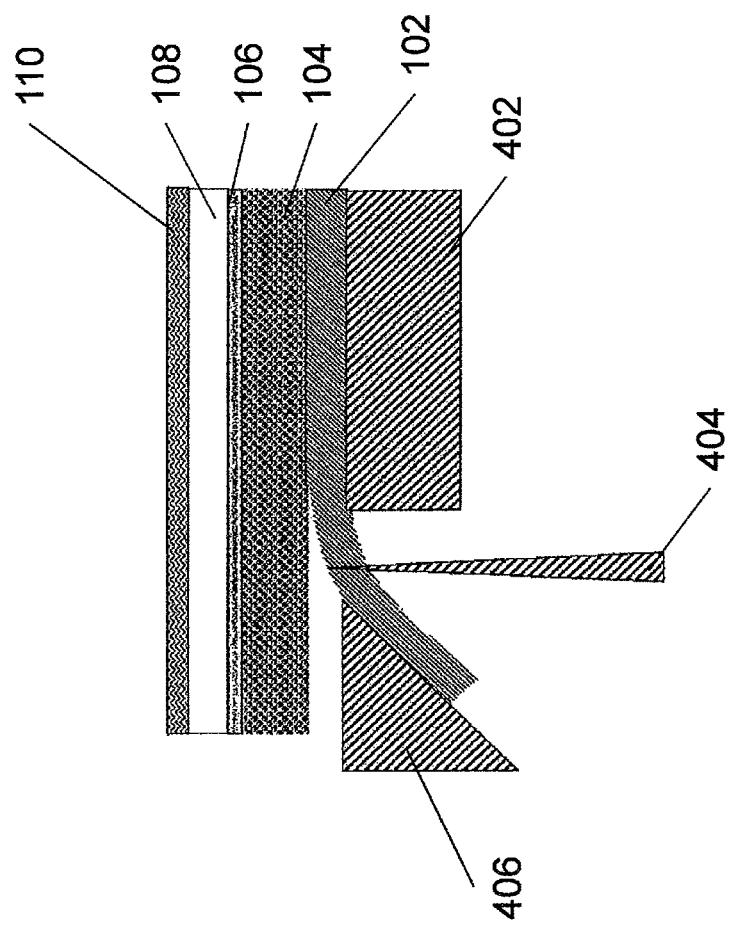
FIG. 4 presents a cross sectional view of an example embodiment of a cutting unit.

FIG. 4 presents a cross sectional view of an example embodiment of the cutting unit 304. In the cutting unit 304 the section of the protective film layer 102 not to be removed from the display laminate is supported by a support 402. In the cutting unit 304 the edge of the protective film layer 102 is turned by using a support 406 so that a gap is created between the display film and the protective film layer. The angle of turning of support 406 can be for example 45 degrees. After turning the protective film layer 102, the protective film layer 102 is cut by a blade 404. Roll 306 can rewind the removed part of the protective film layer 102 while the remaining display laminate is continuing to the next processing unit.

After removing a section of the protective film layer 102, a section of the display material layer 104 needs to be removed. Before removing a section of the display material layer 104 located at the same edge as the removed part of the protective film layer 102, the section of display material layer 104 can be wetted. This is done by wetting the area where the display material is to be removed for example with washing liquid, solvent or similar medium in wetting unit 308. The wetting unit 308 is constructed so that the film enters a cavity forming a small washing chamber through a narrow gap. Washing liquid, solvent or similar medium is sprayed into the area to be removed from below. The used medium is directed from the washing chamber downwards by gravity. This creates a vacuum in the washing chamber preventing the medium from leaking out of the chamber through web enter or exit gaps.

Figure 5:
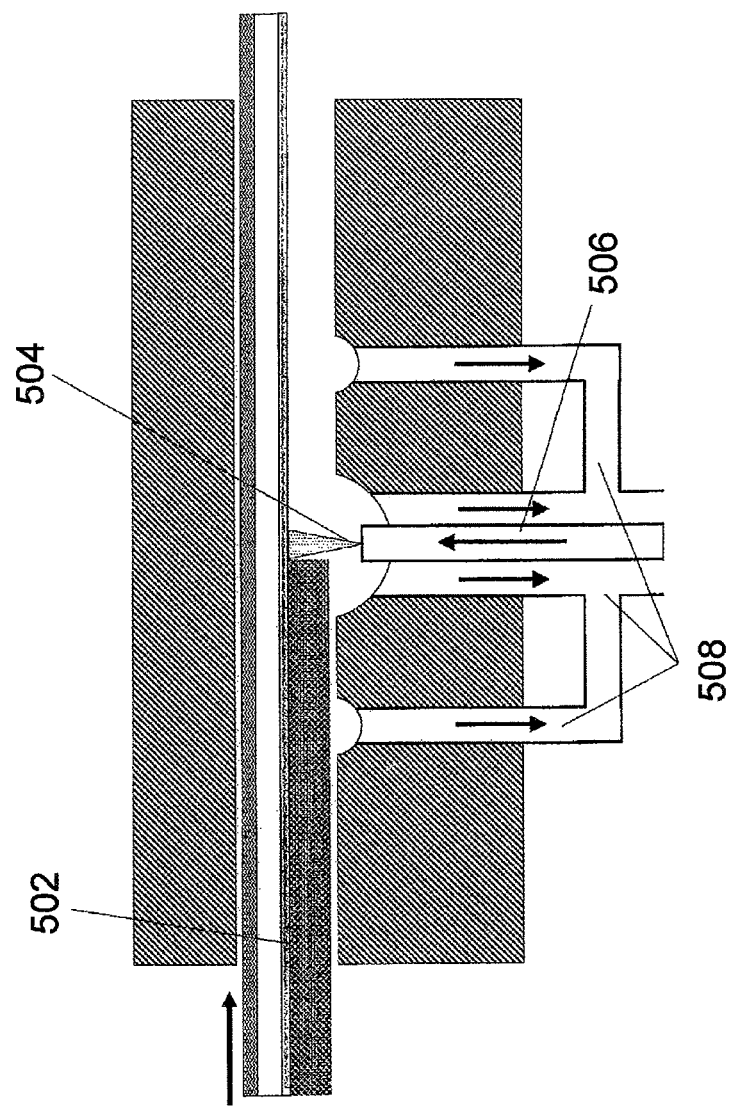
FIG. 5 presents a cross sectional view of an example embodiment of a spray unit in direction the display laminate is running.

After optional wetting, the section of the display material layer 104 is removed in the spraying unit 310. FIG. 5 presents an example embodiment of the spraying unit 310 viewed in direction the display laminate is running. While the continuous display laminate 502 is running through the spraying unit, spray 504 is removing a section of the display material layer as the display laminate passes the spray 504. A medium feed line 506 is arranged to provide medium to be sprayed to the spray 504. The medium used for removing the display material layer 104 can contain liquid or gas; it can be for example washing liquid or solvent. The drain lines 508 can be used for directing the used medium back to the high pressure pumps 322, 324.

Figure 6:
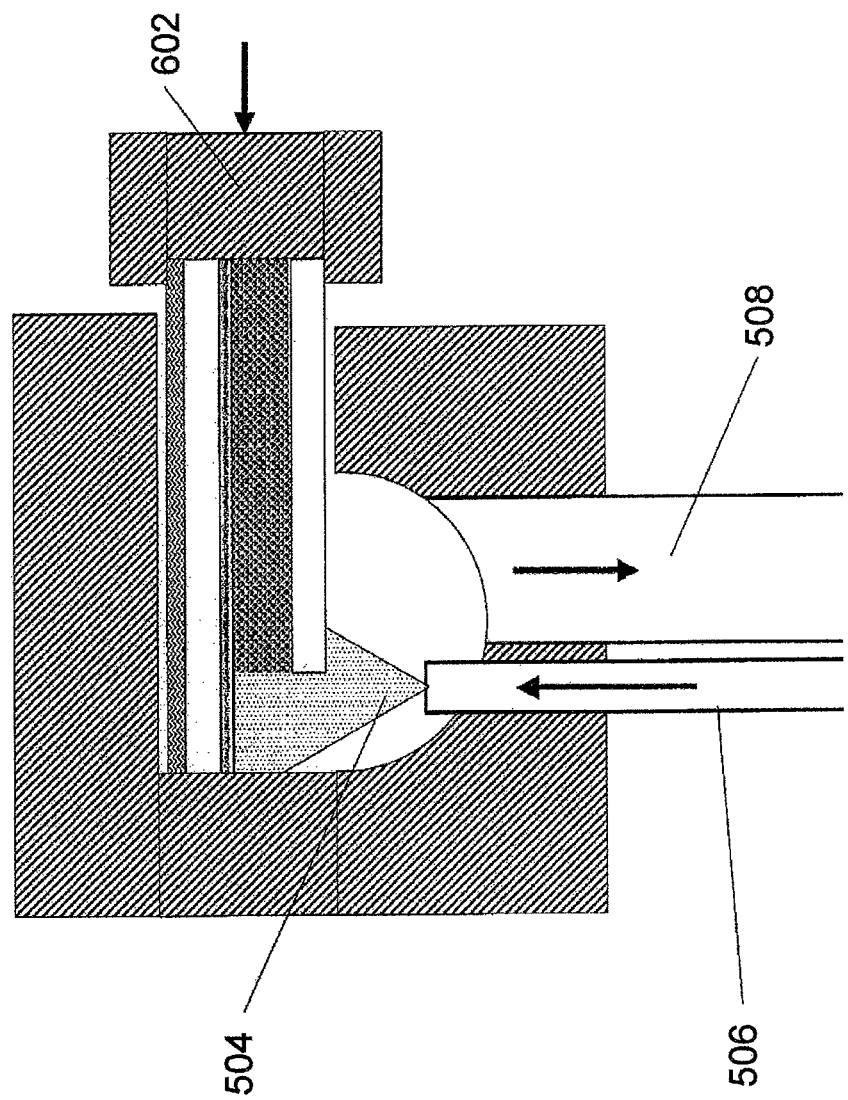
FIG. 6 presents a cross sectional view of an example embodiment of a spray unit in cross direction.

FIG. 6 presents a cross section of the spray unit 310 viewed in cross direction. A support block 602 can be used to keep the continuous display laminate in correct position for the removal of the section of the display material layer 104. The support block 602 can be spring-loaded.

The spraying unit can use higher pressure than the wetting unit. The pressure for example up to 100 bar can be used for removing the electrophoretic ink and the adhesive. However, the high pressure spray 504 does not damage the front electrode layer. The way spraying is done prevents high pressure medium from leaking out of the chamber. Furthermore, the spray 504 can be aligned so that it partially overlaps the protective layer 102 of the display laminate, preventing sprayed medium from entering the region below the protective film layer 102. If necessary, more than one spraying station 310 can be used in series.

After removing the section of display material layer 104, the remaining display laminate can be then dried in a drying station 312 where the display laminate passes through another narrow gap and is blown dry for example by pressurized air. The drying unit can also use a fan or a scraper for drying the display laminate.

The display laminate has a thin masking film 110 on the front side, so any residues from cleaning process can be removed from the front side by removing the masking film 110. The masking film can be rewind to the roll 314.

In one embodiment of the invention the electronically conductive adhesive 202 may be installed to the area where display material was removed. A release can be installed to cover the conductive adhesive area 202.

In the end of the process the display laminate can be rewind back to roll 316. In one embodiment of the invention the display laminate can also be cut into display labels. The cutting can be done e.g. by using a laser.

Some residues from the cleaning process may be left on the back side of the display laminate. When the processed display laminate is rewound, these residues can be transferred to the front side. This can be avoided by laminating a pressure sensitive masking tape from roll 302 to seal the back side of the display laminate which prevents residues from being transferred to the front side of a display laminate in a roll. The pressure sensitive masking tape 302 may be wider than the conductive adhesive 202 and its release. The pressure sensitive masking tape can cover the whole width of the web of display laminate. The material and properties of the masking tape 302 may be such that the release of the conductive adhesive 202 may be removed by removing the masking tape, i.e. the release sticks to the masking tape when the masking tape is removed from display laminate.

In one embodiment of the invention, the apparatus of the present invention can use liquid in the wetting and spraying units. Liquid is circulated in the apparatus. The liquid can be heated or it can heat up in the high pressure process. After exiting the wetting or spraying units, liquid can be cooled in heat exchanger 320, filtered and pressurized again.

The invention relates to a method of processing a display laminate, wherein the display laminate comprises a front electrode layer 106, a display material layer 104 and a protective film layer 102. The method comprises following steps: providing a continuous web 100 of the display laminate, continuously removing a section of the protective film layer 102 from the edge of the display laminate web 100, and after removing the section of the protective film layer 102, continuously removing a section of the display material layer 104 located at the same edge of the web as the removed section of the protective film layer 102.

In one embodiment of the invention the widths of the removed sections of the protective film layer 102 and the display material layer 104 are equal.

In one embodiment of the invention the section the display material layer 104 is removed by spraying medium at least into the section of the display material layer 104 located at the same edge of the web as the removed section of the protective film layer 102.

In one embodiment of the invention after removing the section of the protective film layer 102 and before removing the section of the display material layer 104, the section of the display material layer is continuously wetted by a wetting unit 308 while the continuous display laminate is running through the wetting unit 308.

In one embodiment of the invention display material is stored as a display element roll, and before removing a section of protective film layer 102, the display element roll is unwind. After removing the section of the display material layer 104, display element roll is rewind.

In one embodiment of the invention the medium to be sprayed is gas or liquid.

In one embodiment of the invention removing a section of the protective film layer 102 is done by separating it from the display material layer 104 so that a gap is created between the protective film layer 102 and the display material layer 104 and after that cutting the protective film layer 102.

In one embodiment of the invention the medium is sprayed by using a spray 504 which is aligned so that it partially overlaps the protective film layer 102 preventing medium from entering a region below the protective film layer 102.

In one embodiment of the invention the display laminate is dried before rewinding the display material in a drying unit 312 e.g. by using pressurized air.

In one embodiment of the invention a masking tape 110 is attached to the protective film layer of the display laminate before rewinding the display material.

The invention relates also to an apparatus for processing a display laminate, wherein the display laminate comprises a front electrode layer 106, a display material layer 104 and a protective film layer 102. The apparatus comprises: means for providing a continuous web 100 of the display laminate, a protective film layer remover for continuously removing a section of the protective film layer 102 from the edge of the display laminate web 100, and a display material layer remover, arranged after the protective film layer remover, for continuously removing a section of the display material layer 104 located at the same edge of the web as the removed section of the protective film layer 102.

In one embodiment of the invention the protective film layer remover is a cutting unit 304 adapted to remove a section of the protective film layer 102 from the edge of the display laminate web, which is continuous, while the display laminate is running through the cutting unit 304. The display material layer remover is a spraying unit 310 adapted to remove a section of the display material layer 104 by spraying medium while the continuous display laminate is running through the spraying unit 310 after the section of protective film layer 102 is removed, the section of the display material layer 104 located at the same edge as the removed section of the protective film layer 102.

In one embodiment of the invention the apparatus further comprises: a wetting unit 308 adapted to wet a section of the display material layer 104 while the continuous display laminate is running through the wetting unit 308 after the section of the protective film layer 102 is removed and before the section of the display material layer 104 is removed.

In one embodiment of the invention the apparatus comprises: a display material roll for storing the display element roll web, and an unwinder to unwind the display element roll before removing a section of protective film layer 102, and a rewinder to rewind the display element roll after removing the section of the display material layer 104.

In one embodiment of the invention the apparatus is adapted to use gas or liquid as medium to be sprayed.

In one embodiment of the invention the apparatus is adapted to remove a section of the protective film layer 102 by turning the protecting film layer 102 so that a gap is created between the protective film layer 102 and the display material layer 104 and after the protecting film layer 102 is turned to cut the protective film layer 102 by a blade 404.

In one embodiment of the invention the apparatus comprises a spray 504 which is aligned so that it partially overlaps the protective film layer 102 preventing medium from entering a region below the protective film layer 102.

In one embodiment of the invention the apparatus comprises a drying unit 312 which is adapted to dry the display laminate before the display material is rewind.

In one embodiment of the invention the apparatus is adapted to attach a masking tape 110 to the protective film layer of the continuous display laminate before the continuous display material is rewind.

The invention relates also to a processed display laminate comprising a front electrode layer 106, a display material layer 102 and a protective film layer 102. The display laminate has been processed by using any of the methods of present invention.

In one embodiment of the invention a display laminate comprises a front electrode layer 106, a display material layer 104 and a protective film layer 102. The display laminate is a continuous web 100, wherein the protective film layer 102 and the display material layer 104 are narrower than the front electrode layer 106.

In one embodiment of the invention the protective film layer 102 and the display material layer 104 have a common edge with the front electrode layer 106 on the first side and a common edge with each other but not with the front electrode layer 106 on the opposite side.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. An apparatus for continuously processing a display laminate web containing a front electrode layer, a display material layer and a protective film layer without damaging the front electrode layer, wherein the apparatus comprises:
    means for providing a continuous web of the display laminate,
    a protective film layer remover for continuously removing a section of the protective film layer from an edge of the display laminate web, wherein the protective film layer remover is a cutting unit adapted to remove a section of the protective film layer from the edge of the display laminate web, which is continuous, while the display laminate is continuously running through the cutting unit a wetting unit provided after the protective film layer remover to wet a section of the display material layer while the continuous display laminate is running through the wetting unit, and a display material layer remover arranged after the wetting unit for continuously removing a section of the display material layer located at the same edge of the web as the removed section of the protective film layer wherein the display material layer remover is a spraying unit adapted to remove a section of the display material layer by a spraying medium while the continuous display laminate is running through the spraying unit after the section of protective film layer is removed, the section of the display material layer being located at the same edge as the removed section of the protective film layer.

2. The apparatus of claim 1, wherein a display material roll is provided for storing the display element roll web, an unwinder is provided to unwind the display element roll before removing a section of protective film layer, and a rewinder is provided to rewind the display element roll after removing the section of the display material layer.

3. The apparatus of claim 1, wherein the display material layer remover is a spray unit which utilizes a gas or a liquid.

4. The apparatus of claim 1, wherein a support element is adapted to engage and turn a section of the protective film layer forming a gap between the protective film layer and the display material layer and a blade is utilized to cut the protective film layer.

5. The apparatus of claim 1, wherein the spray unit is aligned so that it partially overlaps with the protective film layer preventing medium from entering a region below the protective film layer.

6. The apparatus of claim 1, wherein a drying unit is utilized to dry the display laminate before the display material is rewound.

7. The apparatus of claim 1, wherein means are provided for attaching a masking tape to the protective film layer of the continuous display laminate before the continuous display material is rewound.

8. An apparatus for continuously processing a display laminate web containing a front electrode layer, a display material layer and a protective film layer without damaging the front electrode layer, wherein the apparatus comprises:

means for providing a continuous web of the display laminate, a protective film layer cutting unit for continuously removing a section of the protective film layer from an edge of the display laminate web, a wetting unit provided after the protective film layer remover to wet a section of the display material while the continuous display laminate is running through the wetting unit, and a spraying unit provided after the wetting unit for continuously removing a section of the display material layer located at the same edge of the web as the removed section of the protective film layer, wherein a display material roll is provided for storing the display element roll web;

an unwinder is provided to unwind the display element roll before removing a section of the protective film layer, and a rewinder is provided to rewind the display element roll after removing the section of the display material layer.

9. A roll-to-roll apparatus for continuously conveying and processing a display laminate web containing a front electrode layer, a display material layer and a protective film layer, without damaging the front electrode layer, which comprises, a supply roll, a cutting unit, a wetting unit, a spray unit, a drying unit and a storage roll, wherein, the supply roll conveys the display laminate web, in sequence to the cutting unit, the wetting unit, the spraying unit, the drying unit and the storage roll, wherein a section of the protective film layer is continuously removed by the cutting unit from an edge of the display laminate web and the removed section is wound on a separate roll, a remaining display laminate web is conveyed to the wetting unit where a section of the display material layer to be removed from the edge of the web, is wetted, the display laminate web is then conveyed to the spraying unit where the wetted section of the display material is removed from the edge of the web without damaging the front electrode layer, and the display laminate web is then conveyed to the drying unit where the web is dried and rewound onto a storage roll.

* * * * *